(12) United States Patent
Kwon et al.

(10) Patent No.: US 8,013,939 B2
(45) Date of Patent: Sep. 6, 2011

(54) VIDEO DECODER FOR DECREASING NOISE INCLUDED IN CHROMINANCE SIGNAL

(75) Inventors: Eui-jin Kwon, Seoul (KR); Hyung-Jun Lim, Suwon-si (KR); Woon Na, Hwaseong-si (KR); Sung-cheol Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1260 days.

(21) Appl. No.: 11/657,954

(22) Filed: Jan. 25, 2007

(65) Prior Publication Data
US 2007/0182858 A1    Aug. 9, 2007

(30) Foreign Application Priority Data
Feb. 3, 2006   (KR) .................... 10-2006-0010583

(51) Int. Cl.
*H04N 5/00*    (2006.01)

(52) U.S. Cl. ......... 348/624; 348/607; 348/638; 348/708

(58) Field of Classification Search .................. 348/624, 348/453, 638–641, 663, 667, 708, 712–713, 348/607, 609, 727, 504, 507; *H04N 5/00, H04N 7/01, 9/47, 9/78*
See application file for complete search history.

(56) References Cited

U.S. PATENT DOCUMENTS

| | | | | |
|---|---|---|---|---|
| 6,377,313 B1 * | 4/2002 | Yang et al. | .................... | 348/630 |
| 7,110,045 B2 * | 9/2006 | Ishihara | .................... | 348/663 |
| 7,227,585 B1 * | 6/2007 | Murdock et al. | .............. | 348/641 |
| 7,554,610 B2 * | 6/2009 | Zhu | .............. | 348/609 |

FOREIGN PATENT DOCUMENTS

| | | |
|---|---|---|
| JP | 7-231457 | 8/1995 |
| JP | 2000-78608 | 3/2000 |
| KR | 1991-0005365 | 7/1991 |
| KR | 1991-0005705 | 7/1991 |
| KR | 2001-0084015 | 9/2001 |

* cited by examiner

*Primary Examiner* — Trang U Tran
(74) *Attorney, Agent, or Firm* — Mills & Onello, LLP

(57) ABSTRACT

A video decoder removes noise caused by a luminance signal component when separating a chrominance signal from a composite video baseband signal. The video decoder includes a first signal generator generating a first signal, a second signal generator generating a second signal, a third signal generator differentiating the first and second signals and performing a predetermined operation on the differentiated signals to generate a third signal, an operating unit performing a predetermined operation on the third signal to output the chrominance signal, a fourth signal generator performing a predetermined operation on the first and second signals to generate a fourth signal having a value corresponding to the amplitude of the chrominance signal, and a noise removal unit correcting the chrominance signal in response to the third and fourth signals to remove luminance component noise included in the chrominance signal.

12 Claims, 4 Drawing Sheets

VIDEO DECODER FOR DECREASING NOISE INCLUDED IN CHROMINANCE SIGNAL

CROSS-REFERENCE TO RELATED PATENT APPLICATION

This application claims the benefit of Korean Patent Application No. 10-2006-0010583, filed on Feb. 3, 2006, in the Korean Intellectual Property Office, the contents of which are incorporated herein in their entirety by reference.

BACKGROUND OF THE INVENTION

1. Field of the Invention

The present invention relates to a video decoder, and more particularly, to a video decoder capable of effectively reducing noise included in a chrominance signal when separating the chrominance signal from a composite video baseband signal (CVBS).

2. Description of the Related Art

A SECAM video decoder receives a composite video baseband signal and divides the composite video baseband signal into a luminance signal (Y signal) and a color signal (C signal). The color signal is demodulated into chrominance signals Cb and Cr. Original color signals R, G and B are generated using the Y signal and the chrominance signals to form an image on a predetermined display device.

FIG. 1 is a block diagram of a conventional video decoder 10. Referring to FIG. 1, the video decoder 10 includes multipliers 11 and 21, low pass filters 12 and 22, cloche filters 13 and 23, sign check units 14 and 24, differentiators 15 and 25, sign decision units 16 and 26, sign check units 17 and 27, and multipliers 18 and 28. The video decoder may further include a summer 31, a square root unit 41, and an operation unit 51.

The video decoder 10 receives a frequency-modulated composite video baseband signal, and multiplies the received composite video baseband signal by $\cos 2\pi ft$ using the multiplier 11 and $\sin 2\pi ft$ using the multiplier 21, respectively. The output signals of the multipliers 11 and 21 are respectively transmitted through the low pass filters 12 and 22 and the cloche filters 13 and 23. Through this process, a carrier frequency used when the composite video baseband signal was frequency-modulated is removed.

The signals output from the cloche filters 13 and 23 are respectively transferred to the sign check units 14 and 24 and the differentiators 15 and 25. The sign check units 14 and 24 check the signs of the signals input thereto and the differentiators 15 and 25 differentiate the signals input thereto. The sign check units 17 and 27 check the signs of the signals differentiated by the differentiators 15 and 25, and the sign decision units 16 and 26 decide signs using the signals output from the sign check units 14, 24, 17 and 27. The signals differentiated by the differentiators 15 and 25 are respectively squared by the multipliers 18 and 28.

The squared signals are summed by the summer 31, the square root of the summed signal is obtained using the square root unit 41, and then the square root is input to the operation unit 51. Furthermore, the values of the outputs from the sign decision units 16 and 26 are input to the operation unit 51. The operation unit 51 performs a predetermined operation on the input values and outputs the operating result as a chrominance signal Db or Dr.

FIG. 2 is a graph illustrating the characteristic of a SECAM composite video baseband signal. As illustrated in FIG. 2, the composite video baseband signal has a Y signal component distributed in a wide band and a C signal component distributed in a specific band. Two chrominance signals Cr and Cb are alternately transmitted through an even line and an odd line to prevent crosstalk between them. That is, the Y signal and the chrominance signal Cr are transmitted through one of the odd line and the even line and the Y signal and the chrominance signal Cb are transmitted through the next line.

A process of decoding the SECOM composite video baseband signal is divided into a luminance processing operation for the Y signal and a color processing operation for the C signal. Here, the C signal separated from the composite video baseband signal may include the Y signal component distributed in a wide band. In this case, color noise is generated in chrominance signals Cr and Cb demodulated from the C signal so that desired colors cannot be represented on a display. The conventional video decoder cannot effectively remove the Y signal component included in the C signal, and thus the color representation characteristic is degraded due to color noise.

SUMMARY OF THE INVENTION

The present invention provides a video decoder capable of effectively removing color noise generated when a chrominance signal is demodulated from a composite video baseband signal.

According to an aspect of the present invention, there is provided a video decoder for separating a chrominance signal from a frequency-modulated composite video baseband signal. The decoder includes a first signal generator multiplying the composite video baseband signal by a cosine component having a predetermined frequency and low-pass-filtering the multiplied signal to generate a first signal. A second signal generator multiplies the composite video baseband signal by a sine component having the predetermined frequency and low-pass-filters the multiplied signal to generate a second signal. A third signal generator differentiates the first and second signals and performs a predetermined operation on the differentiated signals to generate a third signal having a value corresponding to a frequency band in which the chrominance signal exists. An operation unit receives the third signal and performs a predetermined operation on the third signal to output the chrominance signal. A fourth signal generator performs a predetermined operation on the first and second signals to generate a fourth signal having a value corresponding to the amplitude of the chrominance signal. A noise removal unit receives the chrominance signal, the third signal and the fourth signal and corrects the chrominance signal in response to the third and fourth signals to remove luminance component noise included in the chrominance signal.

in one embodiment, the third signal generator comprises a first differentiator receiving the first signal and differentiating the received first signal and a second differentiator receiving the second signal and differentiating the received second signal.

The third signal generator can further include a first multiplier squaring the output signal of the first differentiator, a second multiplier squaring the output signal of the second differentiator, a summer summing up the output signal of the first multiplier and the output signal of the second multiplier, and a square root unit calculating the square root of the output signal of the summer.

The fourth signal generator can include a first multiplier receiving the first signal and squaring the first signal, a second multiplier receiving the second signal and squaring the second signal, a summer summing up the output signal of the first multiplier and the output signal of the second multiplier, and a square root unit calculating the square root of the output signal of the summer.

The noise removal unit can include a first control signal generator performing a predetermined operation on the third signal and a predetermined first reference signal to generate a first control value for correcting the chrominance signal, and a second control signal generator performing a predetermined operation on the fourth signal and a predetermined second reference signal to generate a second control value for correcting the chrominance signal.

The noise removal unit can further include a first multiplier receiving one of the first and second control values and multiplying the chrominance signal by the received control value, and a second multiplier receiving the other one of the first and second control values and multiplying the output signal of the first multiplier by the received control value.

In one embodiment, the first reference signal has a value corresponding to the third signal when the chrominance signal does not include a noise component, and the second reference signal has a value corresponding to the fourth signal when the chrominance signal does not include a noise component. In one embodiment, the first control value generator generates the first control value smaller than 1 when the third signal is larger than the first reference signal, and the second control value generator generates the second control value smaller than 1 when the fourth signal is larger than the second reference signal.

According to another aspect of the present invention, there is provided a video decoder for separating a chrominance signal from a frequency-modulated composite video baseband signal. The video decoder includes a first signal generator multiplying the composite video baseband signal by a cosine component having a predetermined frequency and low-pass-filtering the multiplied signal to generate a first signal. A second signal generator multiplies the composite video baseband signal by a sine component having the predetermined frequency and low-pass-filters the multiplied signal to generate a second signal. A third signal generator differentiates the first and second signals and performs a predetermined operation on the differentiated signals to generate a third signal having a value corresponding to a frequency band in which the chrominance signal exists. An operation unit receives the third signal and performs a predetermined operation on the third signal to output the chrominance signal. The noise removal unit receives the chrominance signal and the third signal and controls the chrominance signal in response to the third signal to remove luminance component noise included in the chrominance signal.

In one embodiment, the third signal generator comprises a first differentiator receiving the first signal and differentiating the received first signal and a second differentiator receiving the second signal and differentiating the received second signal. The third signal generator can further include: a first multiplier squaring the output signal of the first differentiator; a second multiplier squaring the output signal of the second differentiator; a summer summing up the output signal of the first multiplier and the output signal of the second multiplier; and a square root unit calculating the square root of the output signal of the summer.

In one embodiment, the noise removal unit comprises a control signal generator performing a predetermined operation on the third signal and a predetermined reference signal to generate a control value for correcting the chrominance signal. In one embodiment, the noise removal unit further comprises a multiplier receiving the control value and the chrominance signal and multiplying the chrominance signal by the control value.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
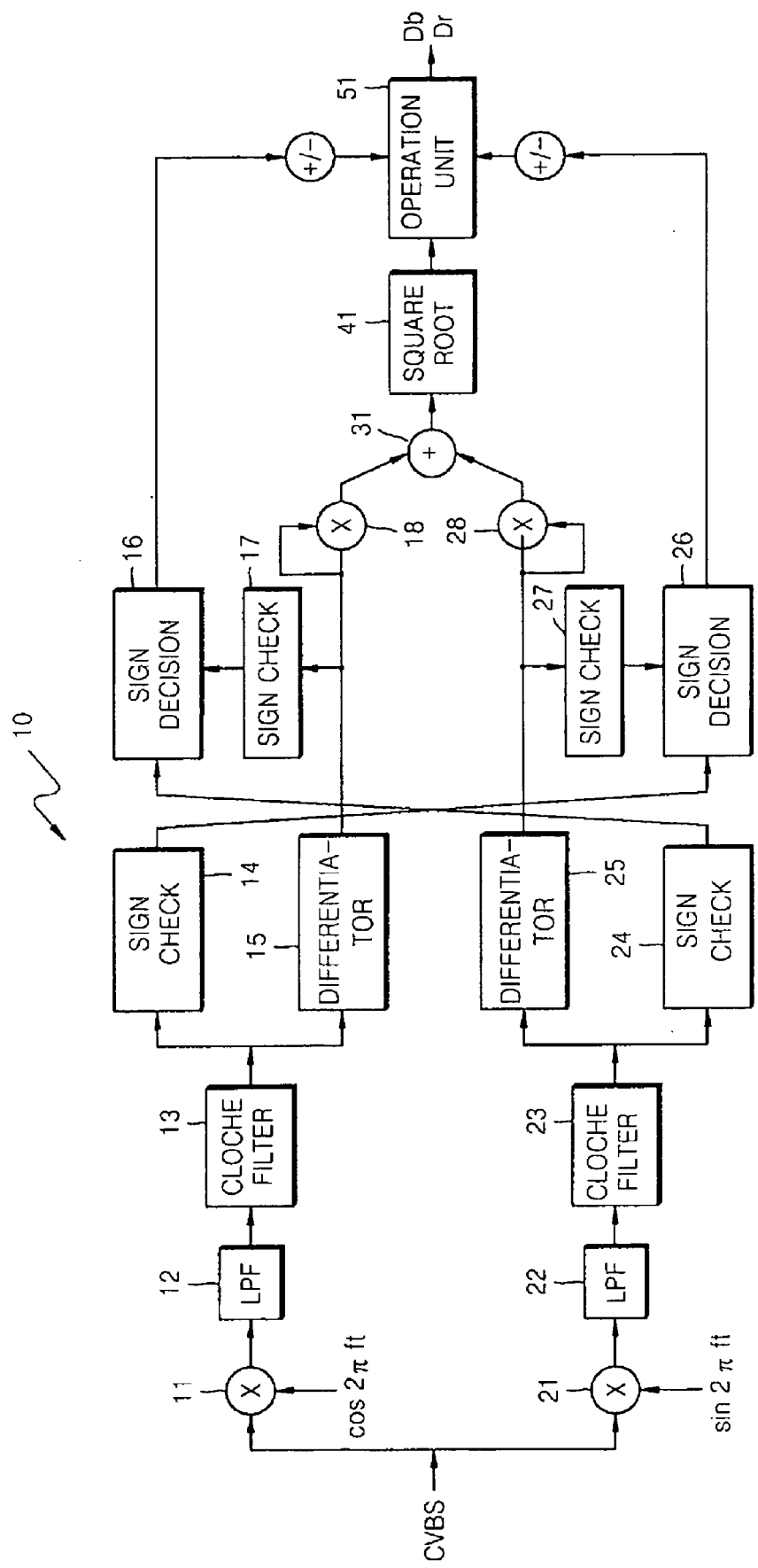
FIG. 1 is a block diagram of a conventional video decoder.
Figure 2:
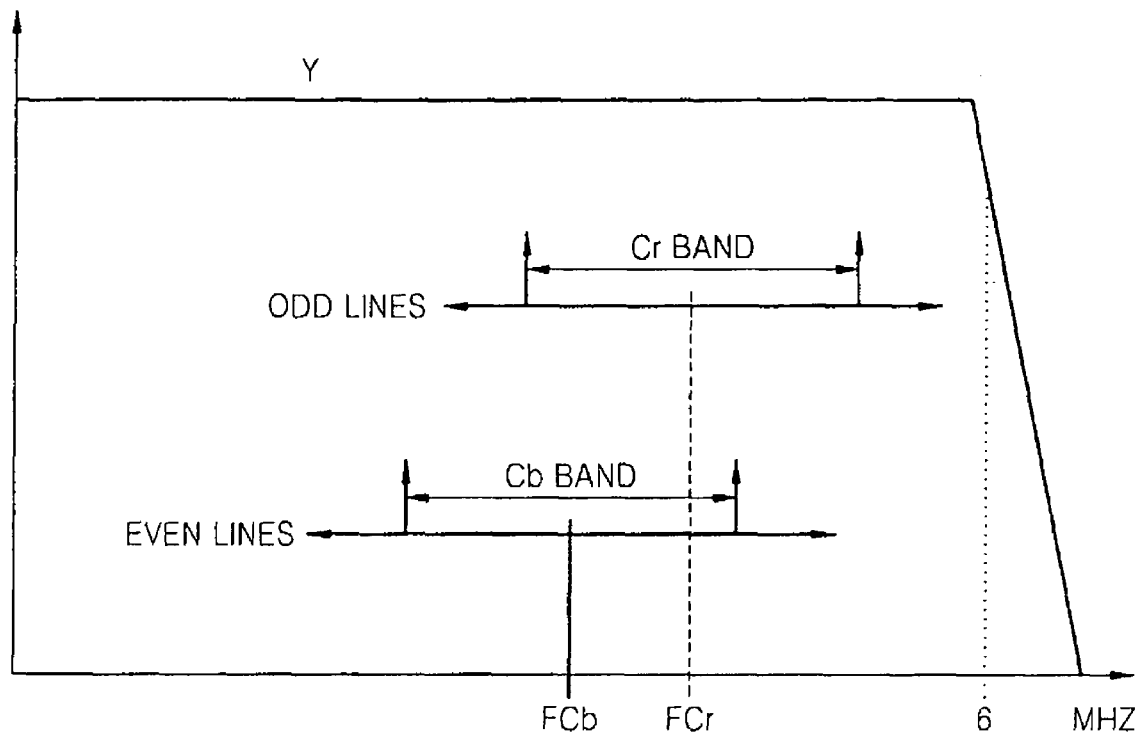
FIG. 2 is a graph illustrating the characteristics of a SECAM composite video baseband signal.
Figure 3:
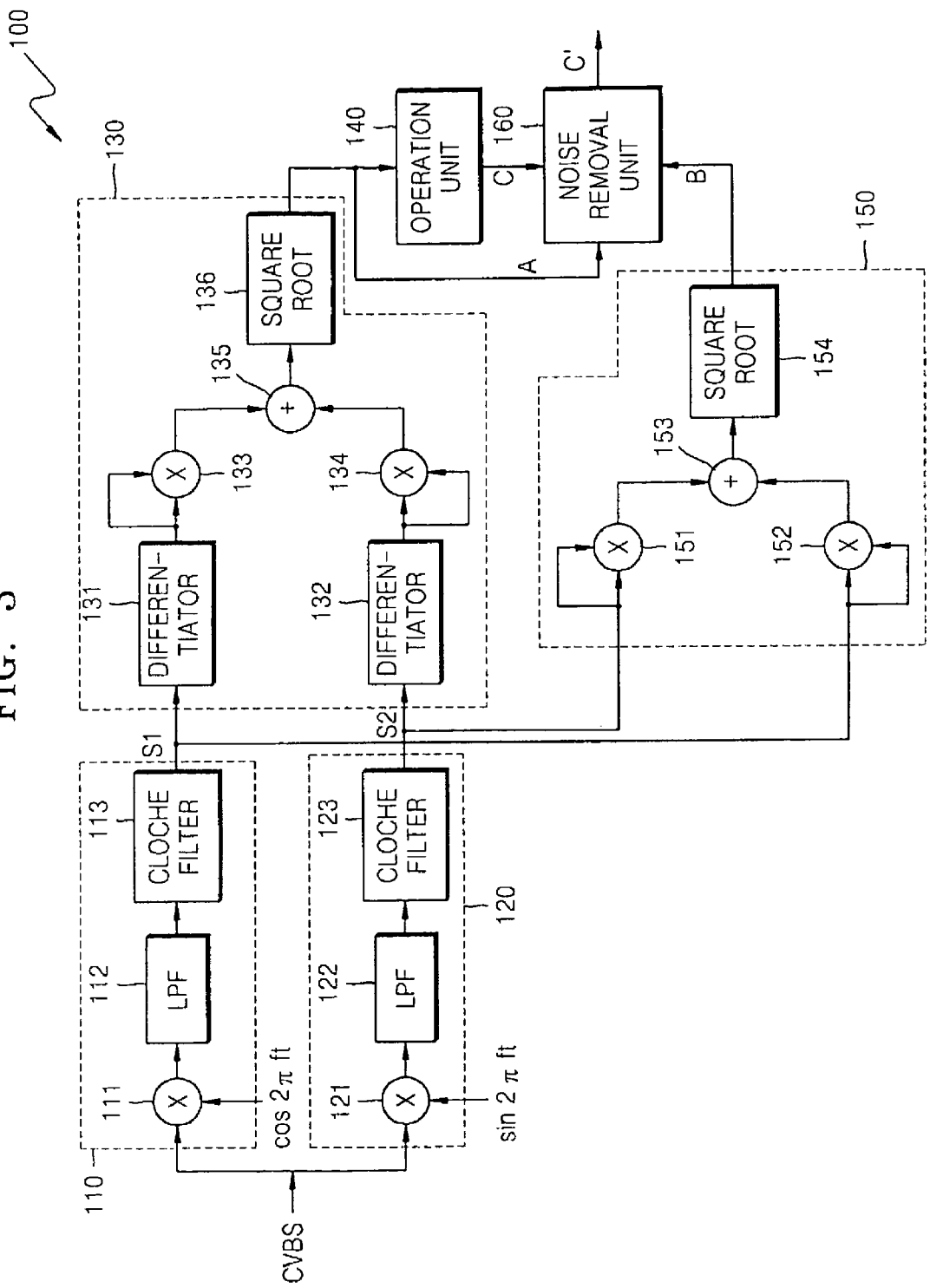
FIG. 3 is a block diagram of a video decoder according to an embodiment of the present invention.

FIG. 3 is a block diagram of a video decoder 100 according to an embodiment of the present invention. Referring to FIG. 3, the video decoder 100 for separating a chrominance signal from a composite video baseband signal (CVBS) includes first, second, third and fourth signal generators 110, 120, 130 and 150, an operation unit 140 and a noise removal unit 160.

The first signal generator 110 includes a multiplier 111 for multiplying the CVBS by cos 2πft, a low pass filter 112 and a cloche filter 113 for filtering the output signal of the multiplier 111. The second signal generator 120 includes a multiplier 121 for multiplying the CVBS by sin 2πft, a low pass filter 122 and a cloche filter 123 for filtering the output signal of the multiplier 121.

The video decoder 100 includes the third and fourth signal generators 130 and 140 to separate the chrominance signal from the CVBS. The third signal generator 130 includes a first differentiator 131 for differentiating the first signal S1 and a second differentiator 132 for differentiating the second signal S2. Furthermore, the third signal generator 130 includes a first multiplier 133 for squaring the output signal of the first differentiator 131 and a second multiplier 134 for squaring the output signal of the second differentiator 132. The third signal generator 130 further includes a summer 135 for summing the output signal of the first multiplier 133 and the output signal of the second multiplier 134, and a square root unit 136 for obtaining the square root of the output signal of the summer 135. The output signal of the square root unit 136 is provided to the noise removal unit 160 as a third signal A.

The operation unit 140 of the video decoder 100 receives the third signal A, and performs a predetermined operation on the third signal A to output a chrominance signal C to the noise removal unit 160. The chrominance signal C corresponds to a chrominance signal Db or Dr and has a constant value. When the chrominance signal C includes a noise component caused by a luminance signal (Y signal), the constant value is increased.

The fourth signal generator 150 performs a predetermined operation on the first signal S1 and the second signal S2 to generate a fourth signal B. For example, the fourth signal B has a value corresponding to the amplitude of a frequency-modulated C signal from which a carrier frequency has been removed.

The fourth signal generator 150 includes a first multiplier 151 for receiving the second signal S2 and squaring the second signal S2 and a second multiplier 152 for receiving the first signal S1 and squaring the first signal S1. The fourth signal generator 150 further includes a summer 153 for summing the output signals of the first and second multipliers 151 and 152 and a square root unit 154 for obtaining the square root of the output signal of the summer 153. The output signal from the square root unit 154 is provided to the noise removal unit 160 as the fourth signal B.

The fourth signal B generated from the first and second signals S1 and S2 has a value corresponding to the amplitude of the frequency-modulated C signal, as described above. When the C signal includes the Y signal component or noise component, the constant value of the fourth signal B is increased. The third signal A is obtained by performing differentiation, multiplication and summation of the first and second signals S1 and S2 and has a value corresponding to a frequency band in which the chrominance signal exists. Though the value of the third signal A has to exist in a predetermined range in the case of a pure chrominance signal, the third signal A can have a value that does not exist in the predetermined range when the chrominance signal includes the Y signal component.

The noise removal unit 160 included in the video decoder 100 according to an embodiment of the present invention receives the third and fourth signals A and B and the chrominance signal C and removes the noise component from the chrominance signal using the third and fourth signals A and B to generate a chrominance signal C' from which the noise component has been removed. The operation of the noise removal unit 160 will be described in more detail with reference to FIG. 4.

Figure 4:
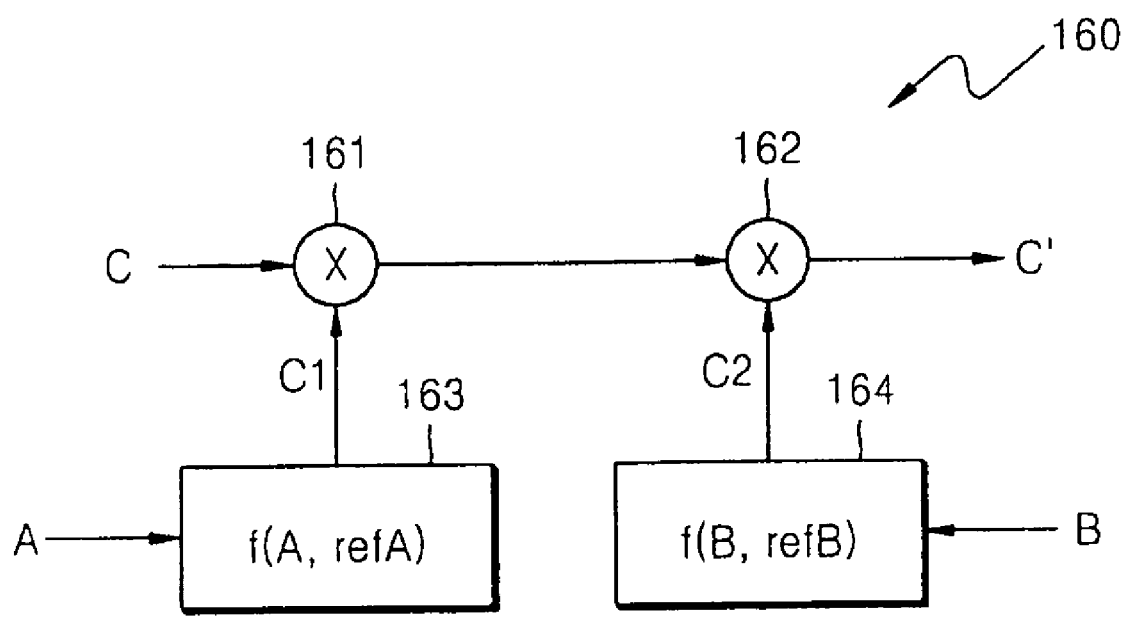
FIG. 4 is a block diagram of a noise removal unit of FIG. 3.

FIG. 4 is a block diagram of the noise removal unit 160 of FIG. 3. Referring to FIG. 4, the noise removal unit 160 includes first and second multipliers 161 and 162 for multiplying signals input thereto. The noise removal unit 160 further includes a first control value generator 163 for receiving the third signal A from the third signal generator 130 (illustrated in FIG. 3) and generating a first control value using the third signal A and a predetermined first reference signal refA, and a second control value generator 164 for receiving the fourth signal B from the fourth signal generator 150 (illustrated in FIG. 3) and generating a second control value using the fourth signal B and a predetermined second reference signal refB. The predetermined first reference signal refA has a value corresponding to the third signal A obtained when the chrominance signal C does not include a Y signal component. The predetermined second reference signal refB has a value corresponding to the fourth signal B obtained when the chrominance signal C does not include a Y signal component.

When the chrominance signal C includes a Y signal component, the chrominance signal C output from the operating unit 140 (illustrated in FIG. 3) has a value larger than an ideal value. Thus, a noise component is removed from the chrominance signal C by the increase in the value of the chrominance signal C caused by the noise component. Here, the first and second signals A and B are respectively compared to the first and second reference signals refA and refB to remove the increase in the value caused by the noise component from the chrominance signal C.

The first control signal generator 163 receives the third signal A and the first reference signal refA and performs a predetermined operation on the third signal A and the first reference signal refA to generate the first control value C1 for correcting the value of the chrominance signal C. When the chrominance signal C includes a noise component, the third signal A is larger than the first reference signal refA. In this case, the first control value C1 generated by the predetermined operation on the third signal A and the first reference signal refA is smaller than 1.

The second control signal generator 164 receives the fourth signal B and the second reference signal refB and performs a predetermined operation on the fourth signal B and the second reference signal refB to generate the second control value C2 for correcting the value of the chrominance signal C. When the fourth signal B is larger than the second reference signal refB, the second control signal C2 generated by the predetermined operation on the fourth signal B and the second reference signal refB is smaller than 1.

The operations performed by the first and second control value generators 163 and 164 are not limited to specific operations. For example, the first control value generator 163 receives the third signal A and the first reference signal refA and outputs the first control value C1 corresponding to the third signal A and the first reference signal refA. When the third signal A is larger than the first reference signal refA, the first control value C1 is smaller than 1. When the third signal A is increased due to a noise component, the first control value generator 163 uses an operation for reducing the first control value C1.

The first multiplier 161 included in the noise removal unit 160 receives one of the first and second control values C1 and C2 and multiplies the chrominance signal C by the received control value. FIG. 4 illustrates that the first multiplier 161 multiplies the chrominance signal C by the first control value C1. The second multiplier 162 receives the output signal of the first multiplier 161 and the second control value C2 and multiplies the output signal of the first multiplier 161 by the second control value C2 to obtain the chrominance signal C' from which a noise component has been removed.

According to the present invention, when a luminance signal and a chrominance signal are separated from a composite video baseband signal and the chrominance signal is demodulated, a luminance signal component included in the chrominance signal can be removed to reduce color noise.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video decoder for separating a chrominance signal from a frequency-modulated composite video baseband signal comprising:

a first signal generator multiplying the composite video baseband signal by a cosine component having a predetermined frequency and low-pass-filtering the multiplied signal to generate a first signal;

a second signal generator multiplying the composite video baseband signal by a sine component having the predetermined frequency and low-pass-filtering the multiplied signal to generate a second signal;

a third signal generator differentiating the first and second signals and performing a predetermined operation on the differentiated signals to generate a third signal having a value corresponding to a frequency band in which the chrominance signal exists;

an operation unit receiving the third signal and performing a predetermined operation on the third signal to obtain the chrominance signal;

a fourth signal generator performing a predetermined operation on the first and second signals to generate a fourth signal having a value corresponding to the amplitude of the chrominance signal; and a noise removal unit receiving the chrominance signal, the third signal and the fourth signal and correcting the chrominance signal in response to the third and fourth signals to remove luminance component noise included in the chrominance signal.

2. The video decoder of claim 1, wherein the third signal generator comprises:
   a first differentiator receiving the first signal and differentiating the received first signal; and
   a second differentiator receiving the second signal and differentiating the received second signal.

3. The video decoder of claim 2, wherein the third signal generator further comprises:
   a first multiplier squaring the output signal of the first differentiator;
   a second multiplier squaring the output signal of the second differentiator;
   a summer summing up the output signal of the first multiplier and the output signal of the second multiplier; and
   a square root unit calculating the square root of the output signal of the summer.

4. The video decoder of claim 1, wherein the fourth signal generator comprises:
   a first multiplier receiving the first signal and squaring the first signal;
   a second multiplier receiving the second signal and squaring the second signal;
   a summer summing up the output signal of the first multiplier and the output signal of the second multiplier; and
   a square root unit calculating the square root of the output signal of the summer.

5. The video decoder of claim 1, wherein the noise removal unit comprises:
   a first control signal generator performing a predetermined operation on the third signal and a predetermined first reference signal to generate a first control value for correcting the chrominance signal; and
   a second control signal generator performing a predetermined operation on the fourth signal and a predetermined second reference signal to generate a second control value for correcting the chrominance signal.

6. The video decoder of claim 5, wherein the noise removal unit further comprises:
   a first multiplier receiving one of the first and second control values and multiplying the chrominance signal by the received control value; and
   a second multiplier receiving the other one of the first and second control values and multiplying the output signal of the first multiplier by the received control value.

7. The video decoder of claim 6, wherein the first reference signal has a value corresponding to the third signal when the chrominance signal does not include a noise component, and the second reference signal has a value corresponding to the fourth signal when the chrominance signal does not include a noise component.

8. The video decoder of claim 7, wherein the first control value generator generates the first control value smaller than 1 when the third signal is larger than the first reference signal, and the second control value generator generates the second control value smaller than 1 when the fourth signal is larger than the second reference signal.

9. A video decoder for separating a chrominance signal from a frequency-modulated composite video baseband signal comprising:
   a first signal generator multiplying the composite video baseband signal by a cosine component having a predetermined frequency and low-pass-filtering the multiplied signal to generate a first signal;
   a second signal generator multiplying the composite video baseband signal by a sine component having the predetermined frequency and low-pass-filtering the multiplied signal to generate a second signal;
   a third signal generator differentiating the first and second signals and performing a predetermined operation on the differentiated signals to generate a third signal having a value corresponding to a frequency band in which the chrominance signal exits;
   an operation unit receiving the third signal and performing a predetermined operation on the third signal to output the chrominance signal; and
   a noise removal unit receiving the chrominance signal and the third signal and controlling the chrominance signal in response to the third signal to remove luminance component noise included in the chrominance signal,
   wherein the noise removal unit comprises a control signal generator performing a predetermined operation on the third signal and a predetermined reference signal to generate a control value for correcting the chrominance signal.

10. The video decoder of claim 9, wherein the third signal generator comprises:
   a first differentiator receiving the first signal and differentiating the received first signal; and
   a second differentiator receiving the second signal and differentiating the received second signal.

11. The video decoder of claim 10, wherein the third signal generator further comprises:
   a first multiplier squaring the output signal of the first differentiator;
   a second multiplier squaring the output signal of the second differentiator;
   a summer summing up the output signal of the first multiplier and the output signal of the second multiplier; and
   a square root unit calculating the square root of the output signal of the summer.

12. The video decoder of claim 9, wherein the noise removal unit further comprises a multiplier receiving the control value and the chrominance signal and multiplying the chrominance signal by the control value.

* * * * *